United States Patent Office 3,501,293
Patented Mar. 17, 1970

3,501,293
PHOTOCONDUCTIVE BENZOBISTHIAZOLES AND THEIR USE IN ELECTROPHOTOGRAPHIC PROCESSES
Nicholas J. Clecak, San Jose, Robert J. Cox, Los Gatos, Samuel L. Solar, San Jose, and Herbert K. Wurster, Los Gatos, Calif., assignors to International Business Machines Corporation, Armonk, N.Y., a corporation of New York
No Drawing. Filed Sept. 18, 1967, Ser. No. 668,696
Int. Cl. G03g 5/06, 13/22; C07d 91/46
U.S. Cl. 96—1
9 Claims

ABSTRACT OF THE DISCLOSURE

The organic photoconductors are of the class of amino-p-benzobisthiazoles and include both linear and angular compounds. The amino substituent contains aryl, arylalkenyl, substituted aryl or substituted arylalkenyl groups. These compounds are useful as photoconductors in electrophotographic processes.

BACKGROUND OF THE INVENTION

Field of the invention

This invention relates to a class of organic photoconductive materials and, more particularly, relates to their preparation and their use as photoconductors in electrophotographic processes, especially those utilizing contact reflux exposure.

Description of prior art

A number of organic photoconductors are known in the prior art, but most of them have not achieved commercial success because their sensitivity or exposure speed is too slow to compete favorably with the commercially used inorganic photoconductors, such as selenium. However, aside from speed, most organic photoconductors offer many advantages over the commercially used selenium. That is, photoconductive elements fabricated from organic photoconductors are easily manufactured, can be substantially translucent, and are sufficiently flexible to be used in belt configurations and the configurations of U.S. patent application Ser. No. 649,162 filed June 22, 1967.

SUMMARY OF THE INVENTION

It has been found that a class of bisthiazoles offer the above advantages and, in addition, exhibit dichroism. These bisthiazoles have a structural formula selected from the group consisting of:

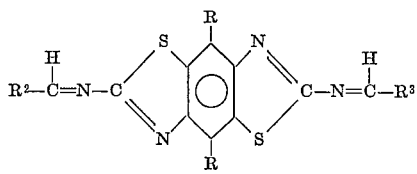

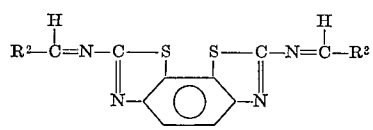

wherein R is selected from the group consisting of hydrogen and lower alkyl, and $R^2$ and $R^3$ may be the same or different and are selected from the group consisting of aryl, arylalkenyl, substituted aryl, and substituted aryl-alkenyl. Preferably, $R^2$ and $R^3$ have the following structural formula:

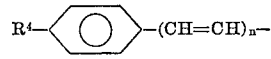

wherein $R^4$ is lower dialkylamino and $n$ is an integer from 0 to 3, inclusive.

In addition, the present invention includes a novel intermediate compound having the following structural formula:

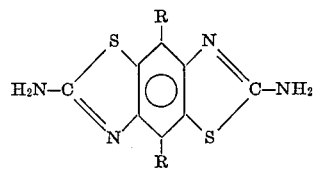

wherein R is selected from the group consisting of hydrogen and lower alkyl.

Compounds of the above class are dichroic photoconductors and are useful in the dichroic reflex process described in U.S. patent application Ser. No. 668,697, filed Sept. 18, 1967. The novel intermediate compounds are useful in the preparation of the linear dichroic photoconductors.

The first reported and purported synthesis of linear 2,6-diamino[1,2-d:4,5-d']bisthiazole was by Green and Perkin, J. Chem. Soc., 83, 1201 (1903). Since that time, several other papers have discussed the synthesis or reactions of these compounds. In each of these cases, either no proof of structure was given, or reference was made to Green and Perkins. It now has been conclusively found that the purported 2,6-diaminobenzo[1,2-d:4,5-d'] bisthiazole in the above references is, in fact, angular 2,7-diaminobenzo[1,2-d:4,3-d']bisthiazole, which is not mentioned by name in the literature. This angular compound was prepared from 1,4-diaminobenzene-2,3-dithiosulfonic acid by the method of Stephens and Wibberly, J. Chem. Soc., 1950, 3336, and also by the reaction of p-phenylenediamine, ammonium thiocyanate, and bromine in acetic acid according to the procedure of French Patent 1,224,183. The methods purportedly are to yield the linear compound.

It has been found that the linear 2,6-diaminobenzo[1,2-d:4,5-d']bisthiazole can be prepared by oxidative ring closure of the p-phenylene bisthiourea (prepared according to O. Billeter and A. Steiner, Ber., 20, 228 (1887)) with bromine in chloroform. The reaction slurry is stirred for about 4 hours following by heating to reflux for about 16 hours. The precipitate is filtered, neutralized with a base, such as ammonium hydroxide, and water washed. After washing, it is slurried in hot dimethylformamide and filtered to yield 2,6-diaminobenzo[1,2-d:4,5-d']bisthiazole.

To determine the structure of the compound prepared by the literature method and the compound by the above general method, NMR spectra were obtained on a Varian HA–100 spectrometer utilizing an Autoshim accessory (trademark of Varian Associates) and a time-averaging computer. The compounds were examined as saturated solutions in dimethylsulfoxide-$d_6$, while dissolved tetramethylsilane was the internal locking signal and the chemical shift reference. After 400 successive scans which improved the sensitivity twenty fold, the time-averaged spectra of the $C^{13}$ satellite regions in the two compounds conclusively established that the compound prepared by the literature methods was the angular 2,7-diaminobenzo[1,2-d:4,3-d']bisthiazole and the compound prepared by the above-described general method was, for the first time, the linear 2,6-diaminobenzo[1,2-d:4,5-d']bisthiazole.

Substituted linear bisthiazoles are prepared in a similar manner by the above-described general method except that the starting p-phenylenediamine dihydrochloride (O. Billeter and A. Steiner) in the preperation of the p-phenylene bisthiourea is disubstituted in the 2 and 5 positions with a lower alkyl, such as methyl.

The next step in the process of preparing compounds of the above general class involves a condensation reaction between an appropriate aldehyde and the diamino substituent of the angular and linear diaminobenzo bisthiazoles. This condensation step is carried by refluxing with a slight excess of the aldehyde in an alcohol, such as ethylene glycol or diethylene glycol.

Examples of compounds prepared by the above general process and within the present invention have the following formulae:

FORMULA 1

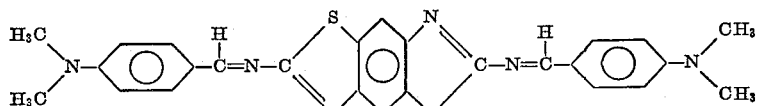

FORMULA 2

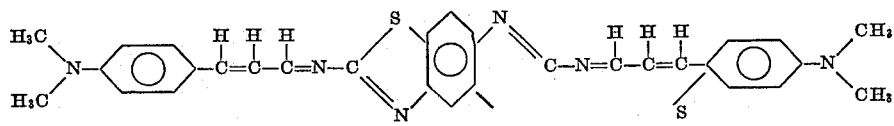

FORMULA 3

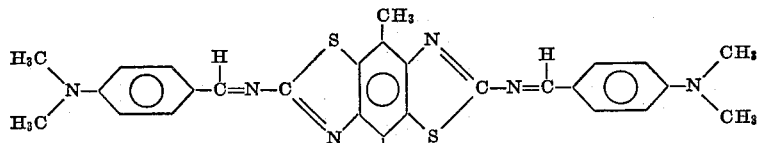

FORMULA 4

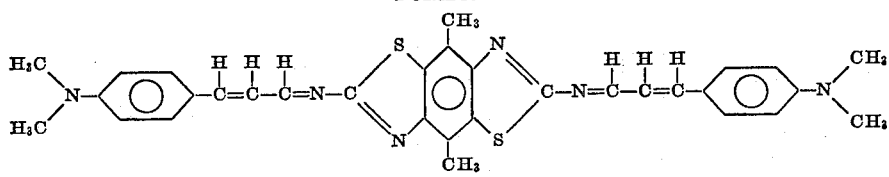

FORMULA 5

Methods of preparing dichroic photoconductive elements with the compounds of the general class are described in U.S. patent application Ser. No. 668,697 filed Sept. 18, 1967.

The substrate material, if one is desired, may be any which satisfy the requirements of electrophotography such as metal, glass, paper, or plastic. Unless it is to be used in a device employing dual corona discharge, such as U.S. Patent 2,922,883, the substrate should preferably have a conductivity greater than $10^{-10}$ ohm$^{-1}$ cm.$^{-1}$.

Application of the solutions of the compounds of the general class, with or without resins, is in the usual manner, such as by spraying, doctor blade, meniscus coating, etc., followed by drying.

While these compounds are highly colored and, hence, absorb in the visible light portion of the electromagnetic spectrum, e.g.—4000–6000 A., their spectral sensitivity to the visible portion may be improved by the addition of dyestuff sensitizers. In addition, activators which increase the photoconductivity of the compounds of the present invention may also be added in varying amounts up to and beyond equal molar. The only limitation on the amount of the activator is the dark conductivity. That is, high concentration of some activators increase the dark conductivity to an extent that the photoconductive element is not useful in electrophotography. To be useful in electrophotography, such activators must be used in lower concentration. Examples of dyestuff sensitizers and activators useful with the compounds of the present invention are found in U.S. Patent 3,232,755.

One type of electrophotographic process in which the compounds of the present invention are useful is known as xerography. This process comprises the laying down of the uniform electrostatic charge on a photoconductive insulating element, exposing the electrostatic charge surface to a pattern of light to effect a decay of charge in illuminated areas, and contacting the latent electrostatic image thus formed with colored electroscopic powder to render the image visible. Next, a copy sheet is brought into contact with the developed image and transferred thereto and fixed thereon. The residual toner remaining For the preparation of photoconductive elements, it is advantageous for the compounds of the general formula to be in solution or organic solvents, suc has tetrahydrofuran, or any other solvent in which the compounds are at least partially soluble. Such solutions are applied to substrates suitable for electrophotography and the solvent is then removed. Mixtures of solvents can also be used.

Instead of the above preparation, the compounds of the general formula can be used in conjunction with a resinous binder. Suitable resins include both natural and synthetic resins, examples of which are balsam resins, phenol resins modified with colophony, coumarone resins, indene resins, cellulose ethers, polyvinylchlorides, polyvinylacetate, acrylic polymers, such as polymethylacrylic esters, polystyrene, polyisobutylene, polyvinylvormal, polycondensates, such as phthalate resins, alkyd resins, maleic acid resins, phenolformaldehyde resins, polyamides, and polyadducts, such as polyurethanes.

The proportion of resin to the photoconductive compound can vary greatly, but elements having a high proportion of resin and a low proportion of photoconductive compound is the less desired. Mixtures of at least equal parts resin and photoconductive compound are preferred.

on the photoconductive insulating element is removed by cleaning and the element is then ready for the preparation of the next copy or the next cycle.

The general nature of the invention having been set forth, the following examples are now presented as to the specific preparation of intermediate compounds and compounds falling within the above general class and the specific preparation of these compounds into photoconductive elements which are then used in electrophotographic processes. The specific details presented are for purposes of illustration and not limitation.

*Example I.*—100 g. (0.44 mole) of p-phenylene bisthiourea (prepared according to O. Billeter and A. Steiner) and 1000 ml. chloroform were charged to a 2 liter round-bottom kettle equipped with stirrer. To this was added dropwise, a solution containing 49 ml. (0.92 mole) bromine in 200 ml. of chloroform, addition time being approximately 1 hour. Reaction mixture was allowed to stir at room temperature for 4 hours, then heated to reflux for 16 hours. Purification of product was accomplished by first filtering off solids from chloroform, then neutralizing with ammonium hydroxide, filtering, water washing, then slurring in hot dimethylformamide, allowing to cool to room temperature, and filtering. The solids were then washed with acetone and dried. The product, which had an M.P. above 350° C. and which was obtained in 35.8 yield, was linear 2,6-diaminobenzo[2,2-d:4,5-d']bisthiazole having the following analysis:

Calculated (percent): C, 43.23; H, 2.72; N, 25.21; S, 28.85. Found (percent): C, 43.02; H, 2.61; N, 25.26; S, 28.79.

Absorption Spectra

| | UV (80% acetic acid solution) | | | | |
|---|---|---|---|---|---|
| | Maxima | | Minima | | |
| $\lambda m\mu$ | 313 | 283 | 238 | 3.05 | 262 |
| $(\epsilon \times 10^{-4})$ | (1.39) | (1.56) | (3.56) | (1.33) | (0.81) |
| | IR (KBr pellets) | | | | |
| $\nu$, cm.$^{-1}$ | 851 | 1,059 | 1,313 | 1,436 | |

NMR Spectra.—With a normal 100 mHz. NMR spectrum, the aromatic absorption appeared downfield of the amine band at 6.61 p.p.m. ($\delta$-scale).

In addition, the 2,6-diaminobenzo[1,2-d:4,5-d']bisthiazole was identified by a $C^{13}$ satellite spectra. It is known that, when one aromatic hydrogen is bonded to a $C^{13}$ atom, the magnetic equivalence of the two protons in the ring is destroyed. The resulting satellite spectrum corresponds to the AB portion of an ABX spin system, which now manifests the proton-proton coupling constant, $J_{AB}$, which in turn reveals whether the protons are ortho or para to one another. Because the four innermost lines of the satellite spectrum lie close to the predominant $C^{12}$-H resonance and are obscured by it, the lines which appear about 80 Hz. on either side of the normal aromatic signal were investigated. This analysis is valid because $J_{C^{13}-H} \simeq 160$ Hz. The time-averaged NMR spectra after 400 scans at a sweep rate of 1 Hz./sec., revealed at a region 80 Hz. downfield of the normal aromatic signal, an interaction between the para hydrogens of a fraction of a Hz, and a satellite pattern consisting essentially of a single, unresolved absorption. Accordingly, it was concluded that the compound was the linear 2,6-diaminobenzo[1,2-d:4,5-d']bisthiazole.

*Example II.*—The reactants of 5.5 g. (0.025 mole) of 2,6-diaminobenzo[1,2-d:4,5-d']bisthiazole and 11.0 g. (0.074 mole) of p-dimethylaminobenzaldehyde in 200 ml. of diethyleneglycol were charged in a round-bottom kettle and heated at reflux for 30 minutes. After cooling to room temperature, red colored solids were filtered off, washed with water, then acetone, and dried. The product, which had an M.P. of above 350° C. and which was obtained in a 61.9% yield, was 2,6-bis(p-N,N-dimethylaminobenzylideneamino) - benzo[1,2-d:4,5-d']bisthiazole (Formula 1) having the following analysis:

Calculated (percent): C, 64.44; H, 4.99; N, 17.34; S, 13.23. Found (percent): C, 64.22; H, 4.87; N, 17.22; S, 13.32.

*Example III.*—A photoconductive element was prepared by dispersing 2,6-bis(p-N,N-dimethylaminobenzlideneamino)-benzo[1,2-d:4,5-d']bisthiazole (Formula 1) in an equal weight of polystyrene disolved in 1,2-dichlorothane and coating the solution on an aluminum slide with a doctor blade set at a 5 mil wet gap. The thus prepared photoconductive element was uniformly electrostatically charged using a Xerox Model D Processor at a potential of +7000 volts. After charging, the element was exposed to a 375 watt GE Photo EBR lamp at a distance of 12 inches for 2 seconds and using positive transparency as a document to be copied. The formed electrostatic image was developed with negatively charged toner (Xerox 914) across the photoconductive element. Again using the Xerox Model D Processor, the toner image was transferred to paper by spraying positive charges on the back of the paper. After transfer of the toner image, the toner was fused to the paper on a hot plate to yield a high quality copy of the document with high contrast, high image density, and faint background.

*Example IV.*—The reactants of 1.0 g. (0.005 mole) of 2,6 - diaminobenzo[1,2-d:4,5-d']bisthiazole and 3.0 g. (0.017 mole) 4-dimethylaminocinnamaldehyde in 50 ml. of ethyleneglycol were charged in a round-bottom kettle heated at reflux for 20 minutes. After cooling to room temperature, purple colored solids were washed with acetone, then ether, and dried. The product, which had an M.P. of approximately 340° C. and which was obtained in 43.7 yield, was 2,6-bis(p-N,N-dimethylaminocinnamylideneamino)-benzo[1,2-d:4,4-d']bisthiazole (Formula 2) and had the following analysis:

Calculated (percent): C, 67.14; H, 5.26; N, 15.66; S, 11.95. Found (percent): C, 66.83; H, 5.55; N, 15.60; S, 11.92.

*Example V.*—A photoconductive element was prepared by dispersing 2,6 - bis(p-N,N-dimethylaminocinnamylideneamino)-benzo[1,2-d:4,5-d']bisthiazole (Formula 2) in an equal weight of polystyrene dissolved in 1,2-dichloroethane and coating the solution on an aluminum slide with a doctor blade set at a 5 mil wet gap. The thus prepared photoconductive element was uniformly electrostatically charged using a Xerox Model D Processor at a potential of +7000 volts. After charging, the element was exposed to a 375 watt GE Photo EBR lamp at a distance of 12 inches for 0.1 second and using positive transparency as a document to be copied. The formed electrostatic image was developed with negatively charged toner (Xerox 914) across the photoconductive element. Again using the Xerox Model D Processor, the toner image was transferred to paper by spraying positive charges on the back of the paper. After transfer of the toner image, the toner was fused to the paper on a hot plate to yield a high quality copy of the document with high contrast, high image density, and faint background.

*Example VI.*—A solution of 24 g. of 2,5-dimethyl p-phenylenediamine dihydrochloride and 20 g. ammonium thiocyanate in 150 ml. of water was heated with stirring on a steam bath for 16 hours. The solid product was slurried in hot water, filtered, washed with acetone and dried to give 21 g. of product, (72.4% yield, decomposition point −255° C.) which was 2,5-dimethyl-1,4-phenylene bisthiourea having the following analysis:

Calculated (percent): C, 47.22; H, 5.55; N, 22.02; S, 25.21. Found (percent): C, 47.17; H, 5.43; N, 22.16; S, 25.16.

A slurry of 11.25 g. of 2,5-dimethyl-1,4-phenylene bisthiourea and 8 ml. of bromine in 125 ml. of chloroform was heated at reflux for 1 hour. An additional 5 ml. of bromine was then added and the reaction mixture refluxed for an additional hour. The crude product was filtered, washed with chloroform, and neutralized with ammonium hydroxide. After washing with water, the product was slurried two times in dimethylformamide, filtered, washed with acetone, ether, and dried. The product, which melted about 340° C., and which was obtained in 72.7% yield, was 2,6-diamino-4,8-dimethylbenzo[1,2-d:4,5-d']bisthiazole having the following analysis:

Calculated (percent): C, 47.98; H, 4.03; N, 22.38; S, 25.61. Found (percent): C, 48.20; H, 4.14; N, 22.31; S, 25.64.

*Example VII.*—The reactants of 1.5 g. of 2,6-diamino-4,8-dimethylbenzo[1,2-d:4,5-d']bisthiazole and p-dimethylaminobenzaldehyde in a 100 ml. of diethyleneglycol were heated at reflux for 1 hour, then cooled to room temperature and filtered. The remaining red solids were washed with acetone, ether, and dried. The product was obtained in 29% yield and was 2,6-bis(p-N,N-dimethylaminobenzylideneamino) - 4,8 - dimethylbenzo[1,2 - d:4,5 - d']bisthiazole (Formula 3) having the following analysis:

Calculated (percent): C, 65.60; H, 5.50; N, 16.39; S, 12.50. Found (percent): C, 65.30; H, 5.73; N, 16.24; S, 12.53.

*Example VIII.*—The reactants of 1.5 g. of 2,6-diamino-4,8-dimethylbenzo[1,2-d:4,5-d']bisthiazole and 5.0 g. of 4-dimethylaminocinnamaldehyde in 100 ml. of ethyleneglycol were heated at reflux for 30 minutes. The product was then hot filtered, washed with acetone, ether, and dried. The product, which had a yield of 58.8%, was 2,6-pis(p - N,N - dimethylaminocinnamylideneamino)-4,8-dimethylamino[1,2-d:4,5-d']bisthiazole (Formula 4) having the following analysis:

Calculated (percent): C, 68.05; H, 5.71; N, 14.88; S, 11.35. Found (percent): C, 67.91; H, 5.77; N, 14.96; S, 11.11.

*Example IX.*—The compound 2,7-diaminobenzo[1,2-d:4,3-d']bisthiazole was prepared by both the method of French Patent 1,224,183 and the method of Stephens and Wibberley, J. Chem. Soc., 1950, 3336. By both methods, the above-named compound was produced with an M.P. above 350° C. and having the following analysis:

Calculated (percent): C, 43.23; H, 2.72; N, 25.21; S, 28.85. Found (percent): C, 43.16; H, 2.89; N, 25.10; S, 29.04.

Absorption Spectra

| | UV (80% acetic acid solution) | | |
|---|---|---|---|
| | Minima | | Maxima |
| $\lambda m\mu$ | 291 | 245 | 267 |
| $(\epsilon \times 10^{-4})$ | (1.86) | (3.58) | (1.09) |

| | IR (KBr pellets) | | | | |
|---|---|---|---|---|---|
| $v$, cm.$^{-1}$ | 805 | 938 | 1,300 | 1,409 | 1,582 |

NMR Spectra:
(a) *Normal NMR.*—With a normal 100 mHz. NMR spectrum, the aromatic absorption appeared at 7.25 p.p.m. on the high field side of the amine ($NH_2$) peak.

(b) *$C^{13}$ Satellite Spectra.*—The time-averaged NMR spectra, after 400 scans at a sweep rate of 1 Hz./sec., revealed at the region 80 Hz. upfield of the normal aromatic signal, two lines with 8 Hz. spacing ($J_{AB}$) which established a structure bearing protons in an ortho relationship. Accordingly, it was concluded that the compound was angular 2,7-diaminobenzo[1,2-d:4,3-d']bisthiazole.

*Example X.*—The reactants of 1.15 g. of 2,7-diaminobenzo[1,2-d:4,3-d']bisthiazole and 2.50 g. of p-dimethylaminobenzaldehyde in 25 cc. of diethyleneglycol were heated at reflux for 1 hour. The crude product was poured into water and the solids filtered off. The solids were washed with acetone, ether, and dried. The product was 2,7 - bis(p-N,N-dimethylaminobenzylideneamino)-benzo[1,2-d:4,3-d']bisthiazole (Formula 5) having the following analysis:

Calculated (percent): C, 64.44; H, 4.99; N, 17.34; S, 13.23. Found (percent): C, 64.35; H, 4.00; N, 17.07; S, 13.25.

While the invention has been shown and described with reference to preferred embodiments thereof, it will be appreciated by those skilled in the art that variations in form may be made therein without departing from the spirit and scope of the invention. For example, it will be understood that the compounds are not limited as photoconductors in the mode electrophotography known as xerography, but may be used in persistent electrophotographic methods such as that described in U.S. Patent 2,845,348 or any other method where the photoconductor is exposed before charging. In addition, even though the greatest demand for the present invention is in conjunction with electrophotography, the compounds are also particularly well suited for other photoconductive applications.

What is claimed is:
1. An electrophotographic process comprising forming an electrostatic charge pattern on a photoconductive element and subsequently developing a visible image therefrom, said photoconductive element comprising a compound having a structural formula selected from the group consisting of:

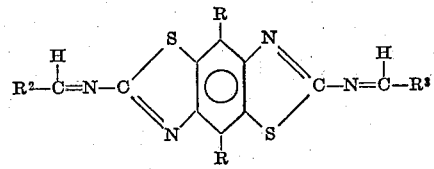

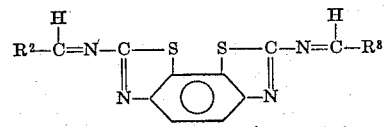

wherein R is selected from the group consisting of hydrogen and lower alkyl, and $R^2$ and $R^3$ may be the same or different and are selected from the group consisting of amino substituted aryl, and amino substituted arylalkenyl.

2. The process of claim 1 wherein $R^2$ and $R^3$ have a structural formula:

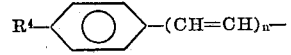

wherein $R^4$ is lower dialkylamino and $n$ is an integer from 0 to 3, inclusive.

3. The process of claim 1 wherein the structural formula is:

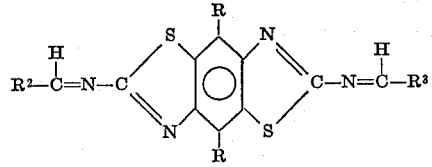

4. The process of claim 3 wherein $R^2$ and $R^3$ have a structural formula

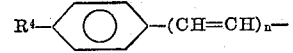

wherein $R^4$ is lower dialkylamino and $n$ is an integer from 0 to 3, inclusive.

5. The process of claim 4 wherein the compound is 2,6 - bis(p-N,N - dimethylaminobenzylideneamino)-benzo[1,2-d:4,5-d']bisthiazole.

6. The process of claim 4 wherein the compound is 2,6 - bis(p-N,N - dimethylaminocinnamylideneamino)-benzo[1,2-d:4,5-d']bisthiazole.

7. The process of claim 4 wherein the compound is 2,6 - bis(p - N,N-dimethylaminobenzlideneamino)-4,8-dimethylbenzo[1,2-d:4,5-d']bisthiazole.

8. The process of claim 4 wherein the compound is 2,6 - bis(p-N,N-dimethylaminocinnamylideneamino)-4,8-dimethylamino[1,2-d:4,5-d']bisthiazole.

9. The process of claim 1 wherein the compound is 2,7-bis(p-N,N - dimethylaminobenzylideneamino) - benzo[1,2-d:4,3-d']bisthiazole.

References Cited

UNITED STATES PATENTS

| 3,148,982 | 9/1964 | Ghys et al. | 96—1 |
| 3,158,475 | 11/1964 | Cassiers et al. | 96—1 |
| 3,238,041 | 3/1966 | Corrsin | 96—1 |
| 3,257,204 | 6/1966 | Sus et al. | 96—1.5 |
| 3,279,918 | 10/1966 | Cassiers et al. | 96—1 |

GEORGE F. LESMES, Primary Examiner

JOHN C. COOPER III, Assistant Examiner

U.S. Cl. X.R.

96—1.5, 1.6; 260—240, 305